No. 703,318. Patented June 24, 1902.
J. SUCHY.
GEAR TRANSMISSION.
(Application filed Feb. 26, 1902.)
(No Model.)
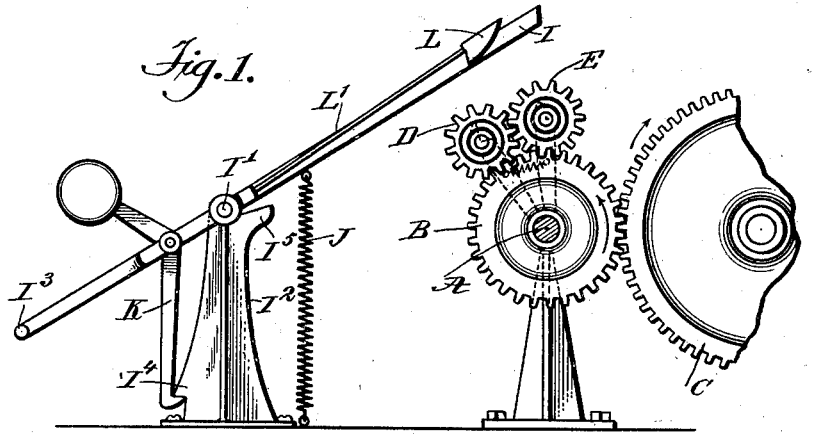
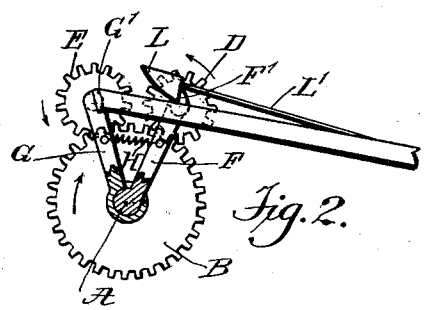
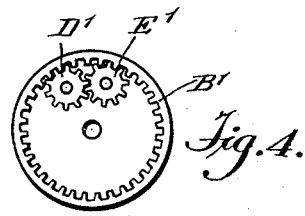
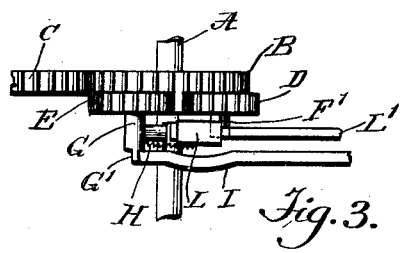
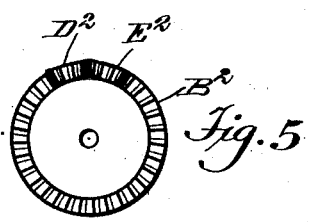
WITNESSES:
INVENTOR
Joseph Suchy
BY
ATTORNEYS

UNITED STATES PATENT OFFICE.

JOSEPH SUCHY, OF LITTLEHEART, NORTH DAKOTA.

GEAR TRANSMISSION.

SPECIFICATION forming part of Letters Patent No. 703,318, dated June 24, 1902.

Application filed February 26, 1902. Serial No. 95,712. (No model.)

*To all whom it may concern:*

Be it known that I, JOSEPH SUCHY, a citizen of the United States, and a resident of Littleheart, in the county of Morton and State of North Dakota, have invented a new and Improved Gear Transmission, of which the following is a full, clear, and exact description.

The object of the invention is to provide a new and improved gear transmission designed for use on self-binding harvesting-machines and other machines and devices which is simple and durable in construction, composed of but few parts, not liable to get easily out of order, and arranged to permit the operator to conveniently throw the driving-gear quickly in and out of gear with the driven gear and to securely hold and lock the driven gear in position whenever it is desired to do so.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a rear elevation of the same in a different position and with parts in section. Fig. 3 is a plan view of the same. Fig. 4 is a face view of a modified form of the improvement, and Fig. 5 is a like view of another modified form of the improvement.

On the shaft A to be driven is mounted to rotate loosely a gear-wheel B, driven from some suitable source, such as a gear-wheel C or the like, and in mesh with the said driven gear-wheel B are the pinions D and E, of which the pinion D is journaled on an arm F, rigidly secured to the shaft A, and the other pinion E is journaled on an arm G, mounted to swing on the shaft A as a fulcrum, the said arms F and G being connected with each other by a spring H, which serves to draw the arms toward each other to hold the pinions D and E in mesh with each other. Now it will be seen that when the gear-wheel B is driven and the two pinions D and E are in mesh with each other then the pinions are locked to the driven gear-wheel B, as they cannot rotate on account of being in mesh with the gear-wheel B and in mesh with each other. Thus the pinions D and E turn bodily with the driven gear-wheel B, and in doing so the arm F, on which the pinion D is journaled, is carried around to rotate the shaft A, so that the latter is driven, and the rotary motion of the shaft can be transmitted to other parts of the machine by any suitable mechanism. When the arms F and G, however, are swung apart against the tension of the spring H, then the pinions D and E move out of mesh with each other, but still remain in mesh with the gear-wheel B, so that the rotation of the latter now rotates the pinions D and E independent one of the other, and if the arm F is now held against swinging around then the shaft A remains at a standstill, while the gear-wheel B keeps on rotating and with it the pinions D and E.

In order to swing the arms F and G apart and to hold the same against swinging around, the following device is provided: The free end of a lever I is adapted to be moved into the path of a projection G' on the free end of the arm G, and this lever is fulcrumed at I' on a suitable bracket I², held on the machine to which the device is applied, the said lever I having a handle I³ under the control of the operator. A spring J is connected with the lever I to swing the same downward into the path of the projection G' whenever the lever is released, the lever being normally locked in an inactive position by a suitable catch K, engaging a shoulder I⁴ on the bracket I². The other end of the arm F is formed with a shoulder F', adapted to be engaged by the head L of a spring-pawl L', secured to the lever I, at one side thereof, as plainly indicated in the drawings. Now when the several parts are in the position shown in Fig. 1 and the gear-wheel B is driven then the shaft A is rotated as described, and when it is desired to stop the rotation of the shaft A then the operator disengages the catch K from the shoulder I⁴, so that the spring J swings the lever I downward to bring the free end of the said lever into the path of the projection G'. The lever I is then swung downward, resting on an arm I⁵, formed on the bracket I². Now as soon as the projection G' abuts against the free end of the lever I then the swinging motion of the arm G is interrupted; but the momentum of the shaft A carries the arm F farther against the tension of the spring H, so that the shoulder F' passes the head L, which now snaps downward to engage the shoulder F' and to hold the same against return movement as soon as the momentum of the shaft ceases. Thus the two arms F and G are held apart in a locked position, and as the pinions D and E are now out of mesh it is evident that the said pinions rotate loosely on their arms, and the arm F is now unlocked from the gear-wheel B and held against movement, so that the shaft A is at a standstill.

It is understood that when the lever I is thrown down into the path of the projection G' then all sudden jar is prevented, as the spring H yields on the further forward movement of the arm F, and consequently the two pinions D and E readily move out of mesh with each other. When it is desired to again rotate the shaft A, then the operator simply swings the forward end of the lever I upward to move the same out of engagement with the projection G' and to move the head L of the pawl L' out of engagement with the shoulder F'. The spring H now immediately swings the arms F and G toward each other to again move the pinions D and E in mesh one with the other to lock the pinions against rotation and to cause the pinions to swing bodily around with the gear-wheel B.

I do not limit myself to the particular arrangement of the gear-wheel and pinions described, as the same may be varied without deviating from the spirit of my invention. For instance, as shown in Fig. 4, the gear-wheel may be in the shape of an internal gear-wheel B' and in mesh with the two pinions D' and E', or the said gear-wheel may be in the form of a bevel gear-wheel $B^2$, as is shown in Fig. 5, and in mesh at all times with bevel-pinions $D^2$ and $E^2$.

Having thus described my invention, I claim as new and desire to secure by Letters Patent—

1. A gear transmission comprising a gear-wheel, and pinions in mesh at all times with the said gear-wheel and adapted to move in and out of mesh with each other, the pinions when in mesh locking the wheel and pinions together, to cause the pinions to swing bodily around with the gear-wheel, as set forth.

2. A gear transmission comprising a driven gear-wheel, a shaft on which the gear-wheel is mounted to turn loosely, an arm secured on the said shaft and carrying a pinion in mesh at all times with the said gear-wheel, and a second pinion at all times in mesh with the said gear-wheel, adapted to move in and out of mesh with the first-named pinion, as set forth.

3. A gear transmission comprising a driven gear-wheel, a shaft on which the gear-wheel is mounted to turn loosely, an arm secured on the said shaft and carrying a pinion in mesh at all times with the said gear-wheel, a second pinion at all times in mesh with the said gear-wheel, adapted to move in and out of mesh with the first-named pinion, an arm mounted to swing loosely on the shaft carrying the said second pinion, and a spring connecting the arms with each other, as set forth.

4. A gear transmission comprising a driven gear-wheel, a shaft on which the gear-wheel is mounted to turn loosely, an arm secured on the said shaft and carrying a pinion in mesh at all times with the said gear-wheel, a second pinion at all times in mesh with the said gear-wheel, adapted to move in and out of mesh with the first-named pinion, an arm mounted to swing loosely on the shaft carrying the said second pinion, a spring connecting the arms with each other, and an obstruction adapted to be moved into the path of the said pivoted arm, as set forth.

5. A gear transmission comprising a driven gear-wheel, a shaft on which the gear-wheel is mounted to turn loosely, an arm secured on the said shaft and carrying a pinion in mesh at all times with the said gear-wheel, a second pinion at all times in mesh with the said gear-wheel, adapted to move in and out of mesh with the first-named pinion, an arm mounted to swing loosely on the shaft carrying the said second pinion, a spring connecting the arms with each other, an obstruction adapted to be moved into the path of the said pivoted arm, and means for locking the shaft against return movement toward the pivoted arm, as set forth.

6. A gear transmission comprising a loose gear-wheel, pinions in mesh at all times with the said gear-wheel, and arms on which the pinions are journaled, the arms being adapted to swing toward or from each other to bring the pinions in or out of mesh with each other, as set forth.

7. A gear transmission comprising a loose gear-wheel, pinions in mesh at all times with the said gear-wheel, and arms on which the pinions are journaled, the arms being adapted to swing toward or from each other to bring the pinions in or out of mesh with each other, one of the arms being secured to the shaft and the other being mounted to swing loosely on the shaft as a fulcrum, as set forth.

8. A gear transmission comprising a driven gear-wheel, a pinion in mesh with the said gear-wheel, carried by an arm mounted to swing, the axis of the gear-wheel and that of the arm coinciding, and a second pinion, adapted to move in mesh with the said first-named pinion and in mesh with the said gear-wheel, to lock the pinions against rotation and to cause the pinions and arm to bodily move with the gear-wheel, as set forth.

In testimony whereof I have signed my name to this specification in the presence of two subscribing witnesses.

JOSEPH SUCHY.

Witnesses:
JOHN H. WATTS,
CHAS. PICKER.